(12) United States Patent
Koo et al.

(10) Patent No.: US 10,279,509 B2
(45) Date of Patent: May 7, 2019

(54) WASTE CARPET AND FELT SCRAP RECYCLING APPARATUS AND METHOD THEREOF

(71) Applicants: Hyundai Motor Company, Seoul (KR); DITGREEN CO. LTD., Chungcheongbuk-do (KR)

(72) Inventors: Hong Mo Koo, Gyeonggi-do (KR); Byeong Kwon Hong, Gyeonggi-do (KR); Bong Hyun Park, Gyeonggi-do (KR); Jae Woong Ha, Seoul (KR); Soon Yong Park, Daejeon (KR)

(73) Assignees: Hyundai Motor Company, Seoul (KR); DITGREEN CO. LTD., Chungcheongbuk-do (KR)

( * ) Notice: Subject to any disclaimer, the term of this patent is extended or adjusted under 35 U.S.C. 154(b) by 19 days.

(21) Appl. No.: 14/966,222

(22) Filed: Dec. 11, 2015

(65) Prior Publication Data

US 2016/0368171 A1    Dec. 22, 2016

(30) Foreign Application Priority Data

Jun. 17, 2015    (KR) .................. 10-2015-0085638

(51) Int. Cl.
  *B03B 9/06*    (2006.01)
  *B09B 3/00*    (2006.01)
  *B09B 5/00*    (2006.01)
  *B02C 18/00*   (2006.01)
  (Continued)

(52) U.S. Cl.
  CPC .......... *B29B 17/02* (2013.01); *B02C 18/0084* (2013.01); *B02C 18/18* (2013.01);
  (Continued)

(58) Field of Classification Search
  CPC ... B29B 17/02; B29B 17/0203; B29B 17/022; B65B 13/183; B65B 13/02; B65B 13/08;
  (Continued)

(56) References Cited

U.S. PATENT DOCUMENTS

| | | | |
|---|---|---|---|
| 5,316,150 A * | 5/1994 | Fisher | B07B 9/00 209/23 |
| 5,897,066 A * | 4/1999 | Bacon | B02C 18/146 241/160 |

(Continued)

FOREIGN PATENT DOCUMENTS

| | | |
|---|---|---|
| JP | 11-179335 | 7/1999 |
| JP | 2002-172619 A | 6/2002 |

(Continued)

OTHER PUBLICATIONS

Google Definition—According; printed Oct. 24, 2017.*
Extended European Search Report for European Patent Application No. 15200891.8, dated Nov. 8, 2016, 8 pages.

*Primary Examiner* — Shelley M Self
*Assistant Examiner* — Joseph Finan
(74) *Attorney, Agent, or Firm* — Mintz Levin Cohn Ferris Glovsky and Popeo, P.C.; Peter F. Corless

(57) ABSTRACT

A wasted carpet and felt scrap recycling apparatus is provided. The waste carpet and felt scrap recycling apparatus includes a feeding unit that feeds a cut scrap while forming a feeding path and a supply unit that is connected to the feeding path and supplies the scrap that passed the feeding unit along the feeding path while pressing the scrap. A separation unit is spaced apart from the supply unit, and provides a frictional force to one surface of the scrap supplied from the supply unit through rotation of the supply unit and separates the scrap into fiber and recycled material.

6 Claims, 5 Drawing Sheets

(51) Int. Cl.
  *B02C 18/18* (2006.01)
  *B02C 18/22* (2006.01)
  *B02C 23/10* (2006.01)
  *B29B 17/02* (2006.01)
  *B29L 31/00* (2006.01)

(52) U.S. Cl.
  CPC .......... *B02C 18/2266* (2013.01); *B02C 23/10* (2013.01); *B09B 3/00* (2013.01); *B09B 5/00* (2013.01); *B03B 2009/067* (2013.01); *B29B 2017/022* (2013.01); *B29B 2017/0203* (2013.01); *B29L 2031/7322* (2013.01); *Y02W 30/622* (2015.05); *Y02W 30/667* (2015.05)

(58) Field of Classification Search
  CPC ..... B65B 35/243; B65B 35/405; B65G 15/12; B02C 18/0084; B02C 18/18; B02C 18/2266; B02C 23/10; B09B 3/00; B09B 5/00; Y02W 30/622; Y02W 30/667; B03B 2009/067
  See application file for complete search history.

(56) References Cited

U.S. PATENT DOCUMENTS

| | | |
|---|---|---|
| 5,926,918 A | 7/1999 | Snell et al. |
| 8,110,131 B1 | 2/2012 | Dell'Orco et al. |
| 2012/0037734 A1* | 2/2012 | Levy ................ B02C 18/28 241/24.29 |
| 2012/0149284 A1 | 6/2012 | Gillis et al. |
| 2012/0325947 A1 | 12/2012 | Levy et al. |
| 2013/0112790 A1 | 5/2013 | Rees et al. |

FOREIGN PATENT DOCUMENTS

| | | |
|---|---|---|
| JP | 2003-88772 | 3/2003 |
| JP | 2005-246972 | 9/2005 |
| JP | 2007-252964 | 10/2007 |
| JP | 2013-230673 | 11/2013 |
| KR | 10-2001-0045758 A | 6/2001 |
| KR | 10-0974173 | 8/2010 |
| KR | 10-2013-0057665 | 6/2013 |

* cited by examiner

WASTE CARPET AND FELT SCRAP RECYCLING APPARATUS AND METHOD THEREOF

CROSS-REFERENCE TO RELATED APPLICATION

This application claims under 35 U.S.C. § 119(a) the benefit of Korean Patent Application No. 10-2015-0085638 filed on Jun. 17, 2015, the entire contents of which are incorporated herein by reference.

BACKGROUND (a) Technical Field

The present disclosure relates to a wasted carpet and felt scrap recycling apparatus and method and more particularly, to an apparatus that separates wasted carpet and felt scraps into recycled fiber and recycled resin through a recycling process, and a method thereof.

(b) Background Art

Generally, carpets are used on the bottom of the interior of a vehicle to provide various effects such as an anti-vibration effect, an anti-noise effect, and a moisture-resistant effect as an interior material. The interior material typically includes carpets in which polyester fiber is disposed on a polypropylene plate. The carpet for a seat of a vehicle is a carpet having a resin such as polypropylene is coated on a raw material manufactured by implanting nylon or polyester fiber or on a polyester fiber non-fabric raw material. For example, raw material is cut to correspond to the shape of the bottom of a steel plate for the model of the vehicle and thus a substantial amount of scraps (e.g., unused portions) are produced during the cutting process.

Furthermore, the wasted components generated after the vehicle is scraped, inferior components generated in the manufacturing process, and the scraps generated after the products are formed are not properly recycled. Often such scraps are used for plasticization of cement or processed as a heat source in a combined heat plant and power plant. In other words, the scraps are obtained by mixing two or more raw materials, and due to the difficulty required to separate and recycle the scraps, they are classified into industrial wastes and are incinerated and accordingly, cause waste of energy and pollution.

SUMMARY

The present disclosure provides a wasted carpet and felt scrap recycling apparatus that separates wasted carpet and felt scraps into recycled fiber and recycled resin through a recycling process, and a method thereof.

In one aspect, a wasted carpet and felt scrap recycling apparatus may include a feeding unit that feeds a cut scrap while forming a feeding path, and a supply unit that may be connected to the feeding path. The supply unit may be configured to supply the scrap that passed the feeding unit along the feeding path and presses (e.g., applies a force to) the scrap. A separation unit may be arranged to be spaced apart (e.g., separated) from the supply unit, and may provide a frictional force to one surface of the scrap supplied from the supply unit through rotation of the supply unit and may separate the scrap into fiber and resin.

The separation unit may include a rotary body coupled to a rotary shaft and rotated in one direction and a plurality of saw-tooth wires disposed (e.g., installed) on an exterior (e.g., outer) peripheral surface of the rotary body, to rake one surface of the scrap to separate the scrap into fiber and resin when the rotary body is rotated. The supply unit may include a disk that supports a lower portion of the scrap and a supply roller disposed at an upper portion of the scrap. The supply unit may be configured to supply the scrap to the separation unit and press (e.g., applies a compaction force) the scrap and rotate in the same direction as that of the rotary body. The supply roller may be rotated at a speed slower than that of the rotary body. A spacing interval between the separation unit and the supply unit may be adjusted. The feeding path may extend to repeat separation of fiber and resin as a plurality of feeding units, a plurality of supply units, and a plurality of separation units may be provided.

In another aspect, a wasted carpet and felt scrap recycling method may include cutting wasted carpets and wasted scraps, feeding a plurality of scraps along a feeding path and supplying the scraps to a plurality of saw-tooth wires. Further, the method may include raking one surface of the scrap through rotation of the saw-tooth wires and separating the scrap into fiber and resin; and removing foreign substances contained in fiber and feeding the fiber along the feeding path to store the fiber in a state of recycled fiber.

The scraps may have different amounts of resin and may be mixed and supplied to the saw-tooth wires together. Foreign substances may be removed from the scrap and the resin may be stored within the recycled resin. The foreign substances of the residual scraps not separated into fiber and resin may be removed and the residual scraps may be resupplied to the scrap supplying step.

The scrap supplying and the fiber and resin separating processes may be repeated along the feeding path. According to the exemplary embodiment, the scrap may be separated into fiber and resin through a recycling process, since the felt scraps such as carpets and vehicle noise absorbing components may be recycled. Accordingly, the present disclosure may recycle wasted carpets and scraps, and thus may reduce the generation of greenhouse gases and reduce the waste processing costs.

BRIEF DESCRIPTION OF THE DRAWINGS

The above and other features of the present disclosure will now be described in detail with reference to exemplary embodiments thereof illustrated the accompanying drawings which are given hereinbelow by way of illustration only, and thus are not limitative of the present disclosure, and wherein.

Figure 1:
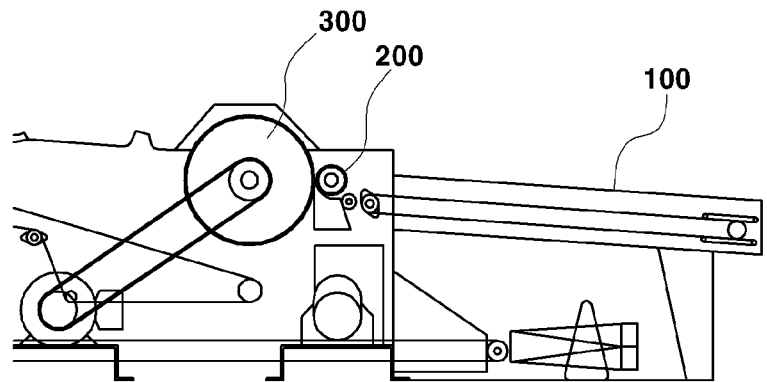
FIG. 1 is an exemplary view schematically illustrating a wasted carpet and felt scrap recycling apparatus according to an exemplary embodiment of the present disclosure.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter, an exemplary embodiment of the present disclosure will be described in detail with reference to the accompanying drawings. The advantages and features of the present disclosure, and methods for achieving them will become clear with reference to the embodiments that are described below in detail together with the accompanying drawings. However, the present disclosure is not limited by the exemplary embodiments but will be realized in various forms, and the embodiments are provided to make the disclosure of the present disclosure perfect and fully inform those skilled in the art of the scope of the present disclosure. Accordingly, the present disclosure is defined only by the scope of the claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
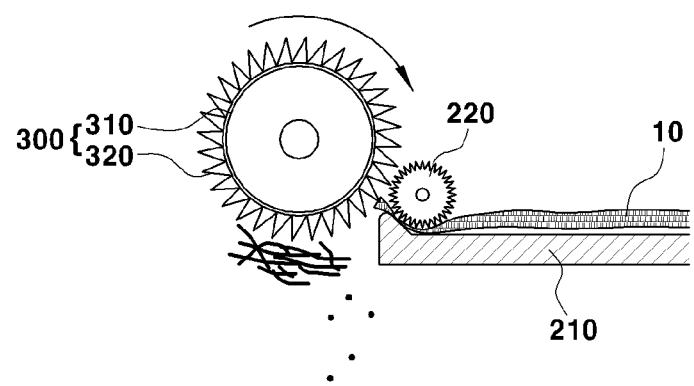
FIG. 2 is an exemplary view schematically illustrating an operation of the wasted carpet and felt scrap recycling apparatus according to an exemplary embodiment of the present disclosure.
Figure 3:
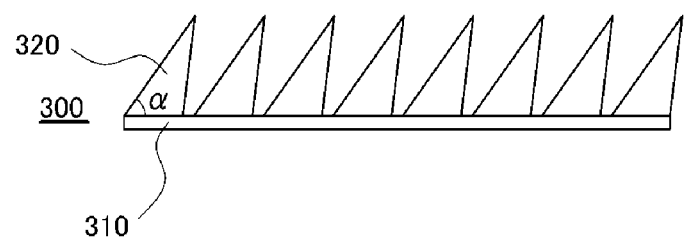
FIG. 3 is an exemplary view illustrating a saw-tooth wire of the wasted carpet and felt scrap recycling apparatus according to an exemplary embodiment of the present disclosure.

FIG. 1 is an exemplary view schematically illustrating a wasted carpet and felt scrap recycling apparatus according an exemplary embodiment of the present disclosure. FIG. 2 is an exemplary view schematically illustrating an operation of the wasted carpet and felt scrap recycling apparatus according to an exemplary of the present disclosure. FIG. 3 is an exemplary view illustrating a saw-tooth wire of the wasted carpet and felt scrap recycling apparatus according to an exemplary embodiment of the present disclosure. As illustrated in FIG. 1, the wasted carpet and felt scrap recycling apparatus may include a feeding unit 100, a supply unit 200, and a separation unit 300. The feeding unit 100 may include a conveyor belt, and may be configured to feed a cut scrap 10 while forming a feeding path. In other words, the feeing unit 100 may feed the scrap 10 that may be cut into sizes of about 10 cm to 25 cm by about 10 cm to 25 cm to generate wasted carpets and scraps having various sizes uniform.

The supply unit 200 may be connected to an end of the feeding path, and may press (e.g., compact or apply a force to) the scrap 10 that passed through the feeding unit 100 to supply the scrap 10 along the feeding path. In other words, the supply unit 200 may include a disk 210 and a supply roller 220 as illustrated in FIG. 2 that rotates while the upper and lower sides of the scrap 10 may be pressed and supply the scrap 10 to the separation unit 300. The disk 210 may have a plate shape, and may support a lower portion of the scrap 10. The supply roller 220 may be spaced apart (e.g., separated) from the disk 210 by a predetermined interval and may be disposed over the scrap 10, and may rotate while pressing the scrap 10 to supply the scrap 10 to the separation unit 300. The supply roller 220 may be spaced apart (e.g., separated) from the disk 210 at a height less than the height of the scrap 10. Accordingly, the scrap 10 may be supplied (e.g., slowly) to the separation unit 300 through rotation of the supply roller 220 while maintaining the position of the scrap 10 between the supply roller 220 and the disk 210.

The separation unit 300 may be disposed to be spaced apart from the supply unit 200. A frictional force may be provided to one surface of the scrap 10 supplied from the supply unit 200 through rotation of the supply unit 200 to separate the scrap 10 into fiber and resin. Accordingly, the separation unit 300 may include a rotary body 310 and a saw-tooth wire 320. The rotary body 310 may have a predetermined diameter, and may be coupled to a rotary shaft to be rotated in the same direction as the rotational direction of the supply roller 220.

A plurality of saw-tooth wires 320 may be disposed on an exterior peripheral surface of the rotary body 310, and may separate the scrap 10 into fiber and resin through an operation of raking and tearing one surface of the scrap 10 upon rotation of the rotary body 310. In other words, as illustrated in FIG. 3, the saw-tooth wire 320 may be coupled to an outer peripheral surface of the rotary body 310 while having a predetermined inclination, and the saw-tooth wires 320 may separate the scrap 10 having a varying thickness based on an installation angle thereof into fiber and resin. In other words, when the installation angle of the saw-tooth wires 320 is greater than a predetermined angle and the number of the saw-tooth wires 320 is accordingly increased, which may be suitable for separating a wasted non-fabric scrap 10 having thin fiber. When the installation angle is less than a predetermined angle and the number may be accordingly reduced (e.g., smaller), which may be suitable for separating a scrap 10 having thick fiber into fiber and resin.

Accordingly, one to eight saw-tooth wires 320 may be installed per inch on the exterior peripheral surface of the rotary body 310 based on the fiber thickness of the scrap 10. Further, the saw-tooth wires 320 may be installed at an angle α of about 40 to 90 degrees (see FIG. 3). The saw-tooth wires 320 may be rotated, and may be separated from the supply roller 220 that may slowly supply the scrap 10 by a predetermined distance to be rotated faster than the supply roller 220 in order to rake and tear one surface of the scrap 10. Accordingly, the scrap 10 may be separated into fiber and resin. Additionally, since the scrap 10 may be separated into fiber and resin through the saw-tooth wires 320, felt scraps such as carpets and vehicle noise absorbing components may be recycled.

Figure 4:
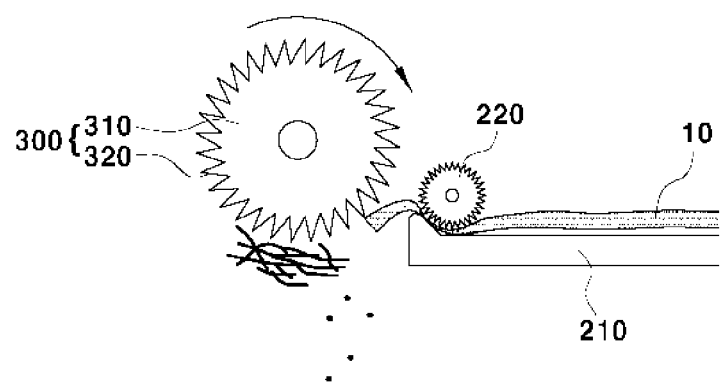
FIG. 4 is an exemplary view illustrating a supply unit and a separation unit of a wasted carpet and felt scrap recycling apparatus according to an exemplary embodiment of the present disclosure.
Figure 5:
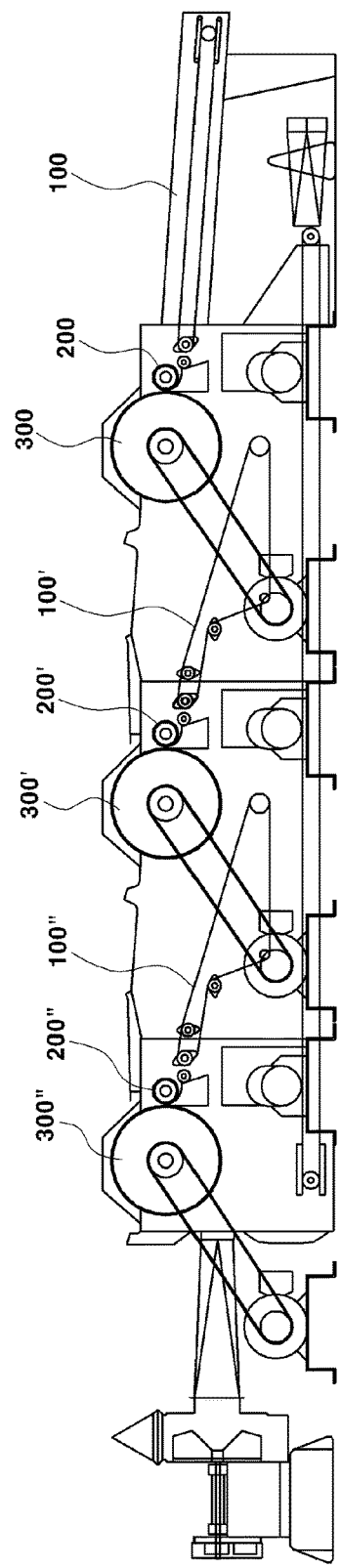
FIG. 5 is an exemplary view schematically illustrating a wasted carpet and felt scrap recycling apparatus according to an exemplary embodiment of the present disclosure.

FIG. 4 is an exemplary view illustrating a supply unit and a separation unit of a wasted carpet and felt scrap recycling apparatus according to an exemplary embodiment of the present disclosure. FIG. 5 is an exemplary view schematically illustrating a wasted carpet and felt scrap recycling apparatus according to an exemplary embodiment of the present disclosure. As illustrated in FIG. 4, the wasted carpet and felt scrap recycling apparatus may include a supply unit 200 and a separation unit 300.

In particular, a spacing interval between the separation unit 300 and the supply unit 200 may be adjusted. In other words, an interval between the saw-tooth wires 320 formed within the separation unit 300 and the disk 210 that forms the supply unit 200 may be adjusted based on the type of the scrap 10. For example, an interval between the saw-tooth wires 320 and the disk 210 may vary based on the type of the scrap and the required quality of recycled fiber. When the hardness of the scrap 10 is high or resin of about 1 mm is coated an interval between the saw-tooth wires 320 and the plurality of feeding units 100' and 100" and the plurality of supply units 200' and 200". Although the separation process may be repeated about three times, this is exemplary and additional feeding units 100, supply units 200, and separation units 300 may be installed to allow repetition of additional processes to separate the scrap 10.

Figure 6:
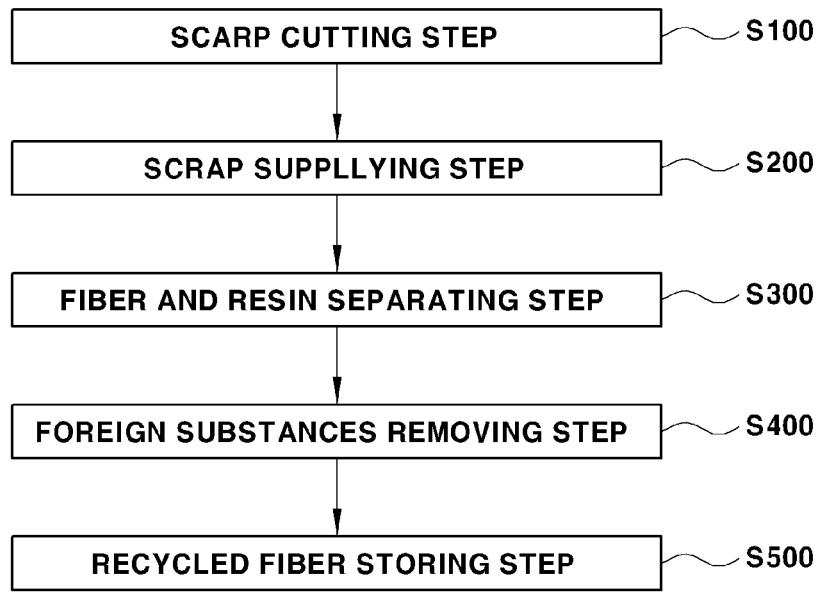
FIG. 6 is an exemplary flowchart schematically illustrating a wasted carpet and felt scrap recycling method according to an exemplary embodiment of the present disclosure.
Figure 7:
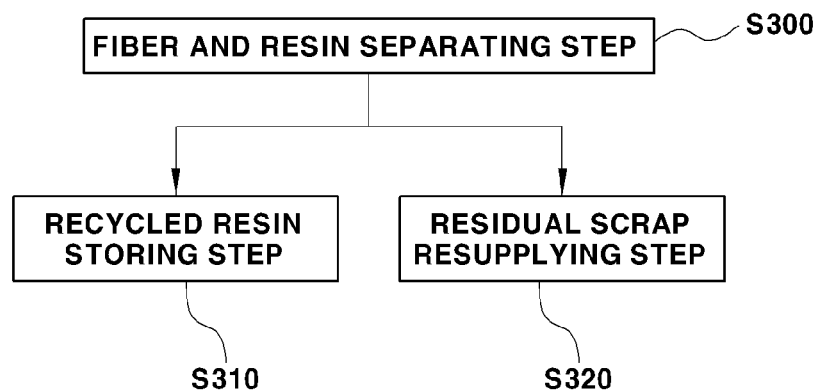
FIG. 7 is an exemplary flowchart illustrating a recycled resin storing process of the wasted carpet and felt scrap recycling method according to an exemplary embodiment of the present disclosure.
Figure 8:
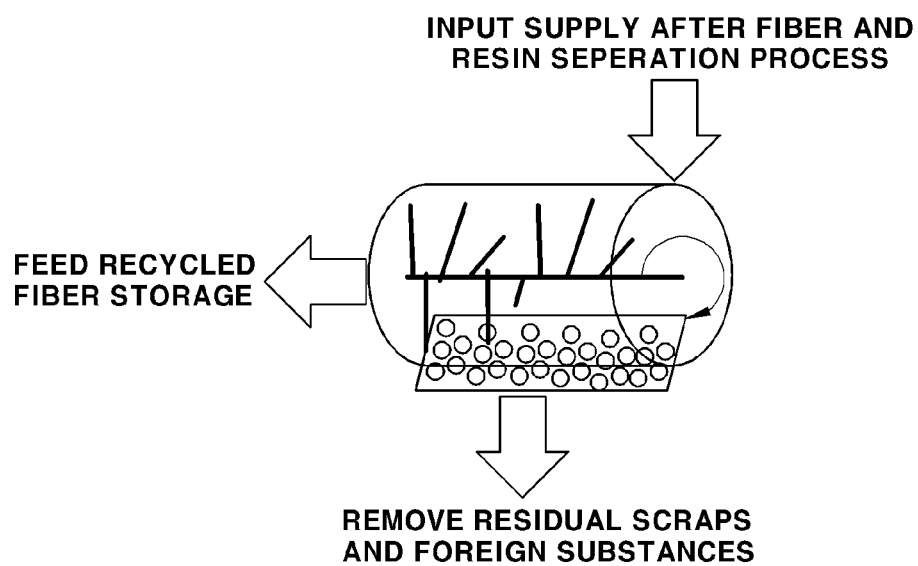
FIG. 8 is an exemplary view schematically illustrating the concept of removal of foreign substances in a wasted carpet and felt scrap recycling method according to an exemplary embodiment of the present disclosure.

FIG. 6 is an exemplary flowchart schematically illustrating a wasted carpet and felt scrap recycling method according to an exemplary embodiment of the present disclosure. FIG. 7 is an exemplary flowchart illustrating a recycled resin storing process of the wasted carpet and felt scrap recycling method according to an exemplary embodiment of the present disclosure. FIG. 8 is an exemplary view schematically illustrating the concept of removal of foreign substances in a wasted carpet and felt scrap recycling method according to an exemplary embodiment of the present disclosure. As illustrated in FIG. 6, the method of recycling the wasted carpet and felt scrap will be described below.

The wasted carpet and scrap may be cut S100. In other words, the scrap may be cut into a size of about 10 cm to 25 cm by about 10 mm to 25 mm and may be cut to form the wasted carpet and scrap having various sizes uniform. Thereafter, a plurality of scraps may be fed along a feeding path, and the scrap may be supplied to the saw-tooth wires S200. When the scrap is supplied to the saw-tooth wires, the plurality of cut scraps having different amounts of resin may be mixed with each other to be supplied to the saw-tooth wires. In other words, both the scraps having the same amount of resin and the scraps having different amounts of resin as well as the scraps having the same amount of resin may be fed and supplied to the saw-tooth wires.

TABLE 1

|  | Embodiment 1 | Embodiment 2 | Embodiment 3 | Embodiment 4 | Embodiment 5 | Embodiment 6 | Embodiment 7 | Embodiment 8 |
| --- | --- | --- | --- | --- | --- | --- | --- | --- |
| Amount of introduced FCS | 100 kg | 80 kg | 60 kg | 40 kg | 80 kg | 80 kg | 80 kg | 80 kg |
| Amount of introduced UBCS | — | 20 kg | 40 kg | 60 kg | 20 kg | 20 kg | 20 kg | 20 kg |
| Number of fiber resin separating processes | 3 | 3 | 3 | 3 | 3 | 3 | 3 | 3 |
| Interval of disk | 2 mm | 2 mm | 2 mm | 2 mm | 1 mm | 4 mm | 2 mm | 2 mm |
| Number of threads | 3 | 3 | 3 | 3 | 3 | 3 | 2 | 4 |
| Angle of threads | 80° | 80° | 80° | 80° | 80° | 80° | 60° | 85° |
| Thickness of wires | 3 mm | 3 mm | 3 mm | 3 mm | 3 mm | 3 mm | 3 mm | 3 mm |
| Amount of recycled fiber | 65 kg | 81 kg | 88 kg | 90 kg | 71 kg | 58 kg | 68 kg | 59 kg |
| Amount of recycled resin | 23 kg | 12 kg | 9 kg | 7 kg | 18 kg | 3 kg | 18 kg | 9 kg |
| Residual amount of dust/scraps | 12 kg | 7 kg | 3 kg | 3 kg | 11 kg | 39 kg | 14 kg | 32 kg |

FCS: Scrap coated with resin
UBCS: Scrap that is not coated with resin disk 210 may be set to about 2 mm or less. Furthermore, when the hardness of the scrap 10 is low and thin resin is coated in the interval between the saw-tooth wires 320 and the disk 210 may be selectively adjusted between the saw-tooth wires 320 and the disk 210 and may provide an interval of about 2 mm to 3 mm.

In an exemplary embodiment of the present disclosure, as illustrated in FIG. 5, a plurality of separation units 300' and 300" may be provided in consideration of the quality of the recycled fiber and productivity. Accordingly, a separation effect and an efficiency of the scrap 10 may be improved through repetition of the separation process of the scrap 10. For example, the scrape 10 may be fed and supplied to the plurality of separation units 300' and 300" through the In other words, as illustrated in Table 1, as seen through Embodiments 1 to 4 the an amount of recycled fiber may increase when scraps that do not contain resin are mixed as compared with scraps coated with resin such as polyethylene. Accordingly, when feeding a plurality of scraps having different amounts of resin along a feeding path and supplying them to the saw-tooth wires may be a cause of increasing the amount of separated recycled fiber S200. Further, the scrap may be separated into fiber and resin by raking one surface of the scrap through rotation of the saw-tooth wires S300.

As illustrated in FIG. 7, following the fiber and resin separation S300, a recycled resin may be stored S310 and a residual scrap may be resupplied S320. For example, foreign substances of the resin separated from the scrap may be removed and the resin may be stored as recycled resin S310. In other words, the residual scrap, dusts, resin, and chips that have not been separated do not proceed to the next process S400 but drop to the bottom, and they may be sent to a separate resin separating apparatus and may be stored as recycled resin S310. In particular, dusts contained in the residual scraps and resin may be removed through air conditioning dust collection, and the resin that passed through a screen (standard net of 4 to 10 mesh) may be separately collected using the screen to store the resin in the state of recycled resin.

In the residual scrap resupplying process S320, the fiber and resin separation S300 may be repeated again by supplying the residual scraps that have not been separated to the scrap supplying process S200. For example, separation of the scrap into fiber and resin, and supplying the scrap S200 and the resin separating process S300 may be continuously performed on a process following the feeding path. Accordingly, the process of separating the scrap may be repeated. Furthermore, after separating the fiber and resin S300, a process of removing foreign substances contained in the fiber may be performed S400, and the fiber separated by feeding the fiber may be stored in the state of recycled fiber S500.

For example, removing foreign substances, as illustrated in FIG. 8, residual scraps may have a relatively high density and may be guided from the interior to the exterior of a high speed rotary body using the principle of centrifugal separation. Further, the residual scraps may be disposed through apertures position on the bottom to be removed. Additionally recycled fiber may be feed to a storage through a suction unit to respectively store the recycled fiber may be effectively stored. The scraps may be separated into fiber and resin and stored through the recycling process in the exemplary embodiment and the felt scraps including carpets and vehicle noise absorbing components may be recycled. Accordingly, since the wasted carpets and felt scraps may be recycled greenhouse gases that are emitted may be reduced and waste processing costs may be reduced.

Although the present disclosure has been described with reference to the embodiments illustrated in the drawings, they are merely exemplary, and various modifications may be made by those skilled in the art to which the present disclosure pertains and it will be understood that all or some of the exemplary embodiments may be selectively combined. Accordingly, the scope of the present disclosure should be determined according to the technical spirits of the claims.

What is claimed is:

1. A waste carpet and felt scrap recycling apparatus, comprising:
    a feeding unit configured to feed a cut scrap while forming a feeding path;
    a supply unit including a supply roller connected to the feeding path and configured to supply the scrap that passes the feeding unit along the feeding path and press the scrap; and
    a separation unit spaced apart from the supply unit, and configured to provide a frictional force to one surface of the scrap supplied from the supply unit through rotation of the supply roller of the supply unit and separate the scrap into fiber and resin,
    wherein the separation unit includes: a rotary body coupled to a rotary shaft and rotated in one direction; and a plurality of saw-tooth wires disposed on an exterior peripheral surface of the rotary body, for raking one surface of the scrap to separate the scrap into fiber and resin when the rotary body is rotated,
    wherein the saw-tooth wires are installed on the exterior peripheral surface of the rotary body at an installation angle of about 40 to 90 degrees relative to the exterior peripheral surface of the rotary body, and
    when the installation angle and a number of the saw-tooth wires are increased, then the scrap is produced with thinner fiber, and when the installation angle and the number of the saw-tooth wires are decreased, then the scrap is produced with thicker fiber.

2. The waste carpet and felt scrap recycling apparatus of claim 1, wherein the supply unit includes:
    a plate that supports a lower portion of the scrap; and
    a supply roller disposed at an upper portion of the scrap, and configured to supply the scrap to the separation unit while pressing the scrap and rotating in the same direction as that of the rotary body.

3. The waste carpet and felt scrap recycling apparatus of claim 2, wherein the supply roller is rotated at a speed less than the rotational speed of the rotary body.

4. The waste carpet and felt scrap recycling apparatus of claim 1, wherein a spacing interval between the separation unit and the supply unit is adjusted.

5. The waste carpet and felt scrap recycling apparatus of claim 1, further comprising a plurality of feeding units, a plurality of supply units, and a plurality of separation units.

6. The waste carpet and felt scrap recycling apparatus of claim 1, wherein one to eight saw-tooth wires are installed per inch on the exterior peripheral surface of the rotary body.

* * * * *